United States Patent Office 3,030,366
Patented Apr. 17, 1962

3,030,366
PIPERAZINOALKYL GLYCOLAMIDES
John H. Biel, Milwaukee, Wis., assignor to Lakeside Laboratories, Inc., Milwaukee, Wis., a corporation of Delaware
No Drawing. Filed Jan. 25, 1961, Ser. No. 84,752
15 Claims. (Cl. 260—268)

This application is a continuation-in-part of my copending application Serial No. 772,691, filed November 10, 1958 now abandoned.

This invention relates to derivatives of piperazine. More particularly, there are provided by this invention novel piperazinoalkyl glycolamides of the formula

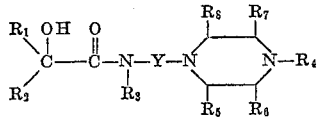

and novel processes and intermediates for producing such compounds, wherein $R_1$ and $R_2$ may be the same or different aryl and substituted aryl groups such as the phenyl, halophenyl, lower alkoxyphenyl, hydroxyphenyl and aminophenyl groups, aralkyl groups and particularly phenyl-lower alkyl groups, thienyl, pyridyl, cycloalkyl groups and particularly the cyclopentyl and cyclohexyl groups, and the 2-furyl group, $R_3$ is hydrogen or a lower alkyl group such as methyl, ethyl, propyl or butyl, Y is a straight or branched alkylene group of 2 to 10 carbons and advisably not more than 5 carbons, $R_4$ is hydrogen, a lower alkyl group such as methyl, ethyl, propyl, isopropyl, butyl or pentyl, an aryl group, particularly monocyclic aryl groups such as the phenyl group and nuclear substituted phenyl groups such as hydroxyphenyl, lower alkoxyphenyl, halophenyl, lower acyloxyphenyl and lower alkylphenyl groups, aralkyl groups, particularly those in which the aryl moiety is monocyclic and the alkyl moiety is a lower alkyl group such as benzyl, phenethyl, phenylpropyl and chlorophenylpropyl groups, hydroxyalkyl groups such as hydroxyethyl, hydroxybutyl and 2-hydroxyisopropyl groups, hydroxy-lower alkoxy-alkyl groups such as the hydroxyethoxyethyl group, acyloxy-lower alkoxy-lower alkyl groups such as the acetoxyethoxyethyl group, acyl groups, particularly those from monocarboxylic acids, such as the formyl, acetyl, propionyl, benzoyl, phenylacetyl, hydroxyacetyl, and lower alkenyl groups such as the cinnamyl and allyl groups, and $R_5$, $R_6$, $R_7$ and $R_8$ are the same or different hydrogen or lower alkyl groups and particularly the methyl group, as well as nontoxic therapeutic acid addition salts thereof.

These compounds, in the form of nontoxic addition salts, exert a pronounced psychotherapeutic effect when administered to animals, and particularly humans. The compounds induce a feeling of relaxation and a relief from anxiety or restlessness without concomitant sedation. Furthermore, they are helpful in clearing up confusional and hallucinogenic states and enable the patient to communicate again with his or her environment and establish a realistic contact. These compounds do not produce any marked anticholinergic effects, such as dry mouth, mydriasis and constipation, or sedation. The compounds of the group having the most pronounced activity are those of the formula

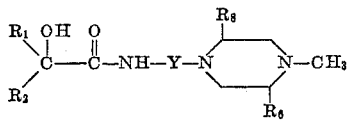

wherein $R_1$ is phenyl, hydroxyphenyl, halophenyl or methoxyphenyl, $R_2$ is phenyl, 2-thienyl, or a substituted phenyl such as hydroxyphenyl, halophenyl, or methoxyphenyl, $R_6$ and $R_8$ are hydrogen or methyl and Y is ethyl, n-propyl or isopropyl.

These compounds, except where $R_4$ is hydrogen, can be conveniently produced by reacting a disubstituted alpha-halo acetylhalide with the appropriate 4-substituted piperazinoalkylamine to produce an intermediate 1-substituted-4-piperazinoalkyl alpha-halo or acyloxydicyclicacetamide which is hydrolyzed to the corresponding 1-substituted-4-piperazinoalkyl alpha-hydroxydicyclicacetamide. This process can be represented as follows:

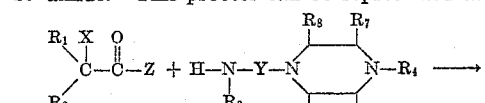

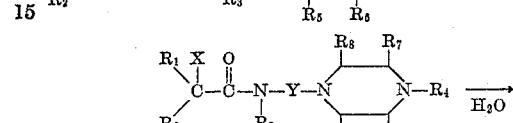

wherein $R_1$, $R_2$, $R_3$, $R_4$, $R_5$, $R_6$, $R_7$, $R_8$ and Y have the significance assigned above except that hydroxyalkyl groups represented by $R_4$ have the hydroxy protected in the form of an ester (acetoxy) or an ether (benzyloxy), and $R_4$ is not hydrogen, X is a reactive halogen, and preferably chlorine, or a reactive acyloxy group such as the acetoxy group, and Z is a reactive halogen, and preferably chlorine.

Representative di-cyclic substituted alpha-halo or acyloxy acetyl halides which may be used in this process are diphenylchloroacetyl chloride, phenyl 2-thienyl chloroacetyl chloride, diphenyl acetoxy acetyl chloride and 3-pyridyl p-chlorophenyl chloroacetyl chloride, phenylcyclohexyl chloroacetyl chloride, phenylcyclopentyl chloroacetyl chloride, dicyclohexyl chloroacetyl chloride, furyl phenyl chloroacetyl chloride and di-2-thienyl chloroacetyl chloride.

Some of the 1-substituted 4-piperazinoalkylamines which may be used as reactants in the process are 1-methyl - 4 - piperazinoethylamine, 1 - (beta - acetoxyethyl) - 4 - piperazinoethylamine, 1 - cinnamyl - 4 - piperazinopropylamine, 1 - (beta - phenethyl) - 4 - piperazinopropylamine, 1-(beta-acetoxyethoxy) - 4 - piperazinoamylamine, 1 - methyl - 4 - piperazinoisopropylamine, 1,2 - dimethyl - 4 - piperazinohexylamine and 1,2,5 - cis-trimethyl-4-piperazinopropylamine.

The reaction is readily effected by bringing the reactants together in an inert liquid reaction medium such as benzene, xylene, n-heptane or toluene. Approximately equimolar amounts of reactants may be employed. The reaction proceeds at room temperature although elevated temperatures such as the reflux temperature may be used to increase the reaction rate. A small amount of a strong organic base such as triethylamine is included in the mixture during reaction to bind the hydrohalic acid released by the reaction. After the reaction is completed, which generally takes no more than 1 to 3 hours, the reaction mixture may be treated according to conventional manipulative techniques to isolate the desired intermediate product.

Some of the 1-substituted-4-piperazinoalkyl alpha-halo or acyloxy dicyclicacetamides which may be so produced are 1-ethyl-piperazinoethyl alpha-chlorodiphenylacetamide,
1-propyl-piperazinopropyl alpha-chloro-alpha-cyclohexyl-alpha-phenyl acetamide, 1-methyl-4-piperazinopropyl alpha-chlorodiphenyl-acetamide,
1-(beta-acetoxyethyl)-4-piperazinoethyl alpha-chloro-diphenyl-acetamide,
1-(cinnamyl)-4-piperazinopropyl alpha-chlorophenyl-2-thienyl-acetamide,
1-(beta-phenethyl)-4-piperazinopropyl alpha-chlorophenyl-2-furyl acetamide,
1-(beta-acetoxyethoxy)-4-piperazinoamyl alpha-acetoxydiphenylacetamide,
1-methyl-4-piperazinoisopropyl alpha-phenylacetoxydiphenylacetamide,
1-benzyl-4-piperazinoethyl alpha-chlorodiphenylacetamide,
1-(phenylisopropyl)-4-piperazinopropyl alpha-chlorodiphenylacetamide,
1,2-dimethyl-4-piperazinopropyl alpha-chlorodiphenylacetamide and
1,2,5-cis-trimethyl-4-piperazinopropyl alpha-chlorodiphenylacetamide.

Hydrolysis of such compounds to form the alpha-hydroxy acetamides is readily achieved with aqueous acid such as an aqueous mineral acid, and preferably aqueous hydrochloric acid. Some of the compounds which are so produced are 1-ethyl-piperazinoethyl alpha-hydroxydiphenylacetamide,
1-propyl-piperazinopropyl alpha-hydroxy-alpha-cyclohexyl-alpha-phenyl acetamide,
1-benzyl-4-piperazinoethyl alpha-hydroxydiphenylacetamide,
1-methyl-4-piperazinopropyl alpha-hydroxydiphenylacetamide,
1-methyl-4-piperazinoisopropyl alpha-hydroxydiphenylacetamide,
1,2-dimethyl-4-piperazinoethyl alpha-hydroxydiphenylacetamide and 1,2,5-trimethyl-4-piperazinoethyl alpha-hydroxydiphenylacetamide and the corresponding alpha-hydroxy derivatives from the alpha-halo or acyloxy intermediates named above.

The compounds in which $R_4$ is hydrogen can be produced by subjecting the 1-benzyl-4-piperazinoalkyl-alpha-hydroxy dicycloacetamides to catalytic hydrogenation. The catalytic hydrogenation is readily effected by adding the N-benzyl compound, preferably as a salt such as the hydrochloride, to a solvent such as water or a lower alcohol. Low pressures of up to 100 p.s.i. of hydrogen are satisfactory. Palladium is a particularly useful catalyst for the hydrogenation. The hydrogenation proceeds quickly and its progress can be measured by the hydrogen uptake. When the hydrogen uptake ceases the reaction can be considered completed. After filtering the reaction mixture it may be evaporated to dryness and the product triturated with a solvent such as ether and separated by filtration.

Representative of the compounds produced in this way are piperazinoethyl benzilamide and piperazinopropyl phenylcyclohexylglycolamide.

Acid addition salts of all the novel compounds within the scope of this invention are produced by contacting the tertiary base with a suitable acid such as a mineral acid, for example, sulfuric acid or hydrochloric acid, or an organic acid such as maleic acid, fumaric acid, acetic acid or citric acid. The acid addition salts of the compounds in which there is an alpha-halo or acyloxy group are formed in the absence of water to avoid hydrolysis of these groups to the hydroxy group.

Since these compounds form acid addition salts they also may be used for the isolation and purification of acidic materials such as penicillin.

The compounds described above are generally formulated into suitable pharmaceutical forms for administration to animals and humans. The preferred route of administration is oral and for this method tablets and capsules are ordinarily recommended. Unit-dosages may contain from about 2.5 to 30 mgm. or more and may be administered once or more a day or at other suitable intervals according to the condition of the patient.

Any suitable pharmaceutical carriers may be used with one or more of the active compounds to achieve a more practical volume for a unit-dosage. Sugar, starch and talc are suitable solid carriers which may be used in forming tablets and capsules. However, liquid carriers such as water may also be used as desired. One typical tablet may have the following composition:

|   | Mg. |
|---|---|
| (1) 1-methyl-4-piperazinoisopropyl benzilamide HCl | 5 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

The compounds of this invention may also be produced by an alternative process in which the 1-substituted-4-piperazinoalkylamine is reacted with the dicyclic glycolic acid in a suitable liquid reaction medium and in the presence of a dehydrating agent such as dicyclohexyldiimide or bisimidazolyl carbonyl reagent. This process can be represented as follows:

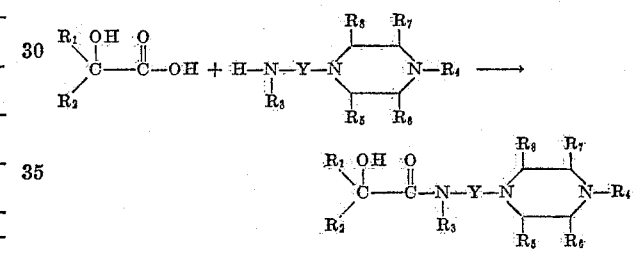

wherein $R_1$, $R_2$, $R_3$, $R_4$, $R_5$, $R_6$, $R_7$, $R_8$ and Y have the significance previously assigned. The reaction may be effected in benzene at room temperature or elevated temperatures such as the reflux temperature and the product isolated by conventional means.

Some of the dicyclic glycolic acids useful in this reaction are those derived from the corresponding dicyclic alpha-halo acetyl halides set forth above and particularly benzilic acid, phenylcyclohexyl glycolic acid, phenylcyclopentyl glycolic acid, 2-thienyl phenyl glycolic acid, dicyclohexyl glycolic acid and methylphenyl-phenyl glycolic acid.

In a further embodiment of the invention it has been found that 1-substituted-4-piperazinopropylamines which are useful in the described process may be readily produced by reacting a 1-substituted piperazine with acrylonitrile to produce a 1-substituted-4-(beta-cyanoethyl)-piperazine. This compound may then be reduced catalytically to the corresponding 1-substituted-4-piperazinopropylamine according to the procedures in Chemical Abstracts 45, 4273 (1951). This process, including the reduction, can be represented as follows:

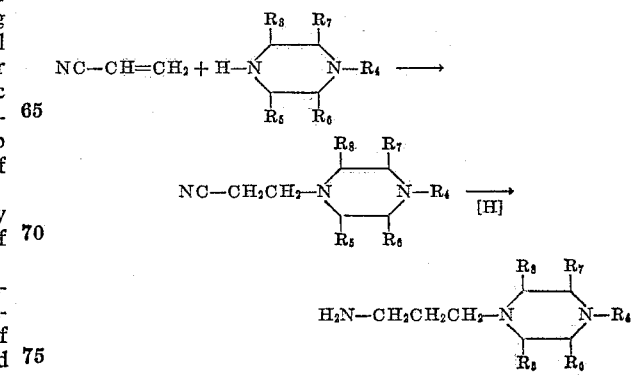

wherein $R_4$, $R_5$, $R_6$, $R_7$ and $R_8$ have the significance previously assigned.

Some of the 1-substituted piperazines which may be used in this process are 1-methylpiperazine, 1-ethylpiperazine, 1-phenylpiperazine, 1-benzylpiperazine, 1,2-dimethylpiperazine, 1-phenylmethylpiperazine, 1-cinnamyl piperazine and similar compounds in which the 1-substituent is a group such as represented by $R_4$.

The reaction is readily effected by bringing acrylonitrile and a 1-substituted piperazine together under liquid reaction conditions. The acrylonitrile may function both as the reactant and the liquid reaction medium. However, an inert organic solvent may be used if desired. When acrylonitrile is employed as the reaction medium the mixture may be heated to reflux to effect reaction in a minimum amount of time. After the reaction is terminated excess acrylonitrile may be distilled off and the residue distilled under reduced pressure to obtain the desired product.

Some of the 1-substituted-4-(beta-cyanoethyl)-piperazines which are so produced are N-(1-phenyl-2-propyl)-N'-(beta-cyanoethyl)piperazine, 1-methyl - 4 - (beta-cyanoethyl)-piperazine, 1-benzyl - 4 -(beta-cyanoethyl)-piperazine, 1-cinnamyl - 4 - (beta-cyanoethyl)piperazine, 1 - hydroxyethyl - 4 - (beta-cyanoethyl)piperazine, 1-formyl - 4 - (beta-cyanoethyl)piperazine, 1-benzoyl-4-(beta-cyanoethyl)piperazine, 1-allyl - 4 - (beta-cyanoethyl)piperazine, and similar compounds in which the 1-substituent has groups represented by $R_4$.

Thee compounds may be readily reduced catalytically to the amines as indicated previously using known procedures.

According to a further embodiment of the invention it has been discovered that 1-acyl-4-piperazinoalkylnitriles may be chemically reduced to the corresponding 1-methylene-4-piperazinoalkylamines. This double reduction process may be represented as follows:

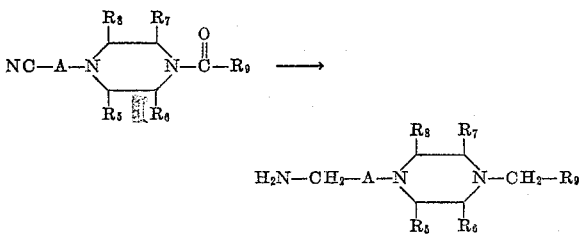

wherein $R_5$, $R_6$, $R_7$ and $R_8$ have the significance previously assigned, A is a lower alkylene group and $R_9$ represents hydrogen, lower alkyl groups such as methyl, ethyl, propyl and butyl, aryl groups and particularly the phenyl group, and nuclear substituted phenyl groups such as the p-chlorophenyl group, aralkyl groups and particularly phenyl-lower alkyl groups such as the phenylmethyl and phenylethyl groups and nuclear substituted phenyl-lower alkyl groups such as the p-chlorophenylethyl group, hydroxyalkyl groups and particularly the hydroxy-lower alkyl groups such as beta-hydroxyethyl, and hydroalkoxyalkyl groups such as the hydroxyethoxyethyl groups.

This chemical double-reduction process is surprising because catalytic reduction only reduces the cyano group and does not reduce the acyl group.

Representative of some of the 1-acyl-4-piperazinoalkylnitriles which may be used as reactants are 1-formyl-2-methyl - 4 - (beta-cyanoethyl)-piperazine, 1-benzoyl-4-(cyanomethyl)-piperazine, 1-phenylacetyl - 4 - (gamma-cyanopropyl)-piperazine and 1-propionyl - 4 - (4-cyanobutyl)-piperazine.

Although the reduction can be effected with several chemical agents it is generally achieved with lithium aluminum hydride, in an anhydrous liquid reaction medium such as tetrahydrofuran. Heat evolves during the reaction so in general only enough heating is done to maintain reflux. The reaction may be terminated in about 1 to 2 hours since it is substantially completed in that time. The excess lithium aluminum hydride may then be decomposed by the addition of water to the reaction mixture. The product may then be recovered by conventional procedures.

Some of the novel 1-substituted - 4 - piperazinoalkylamines which may be produced in this manner are 1,2-dimethyl - 4 - (gamma-propylamino)-piperazine, 1-phenylmethyl - 4 - (beta-ethylamino)-piperazine, 1-phenylpropyl-4-(4-butylamino)-piperazine and 1-propyl - 4 - (5-pentylamino)-piperazine.

According to a still further embodiment of the invention it has been found that some of the 1-substituted-4-piperazinoalkylamines may be readily produced by reacting a 1-substituted piperazine with an alpha-haloalkanone to produce a 1-substituted - 4 - piperazinoalkanone which then can be reacted with ammonia to produce the desired 1-substituted-4-piperazinoalkylamine. This process can be represented as follows:

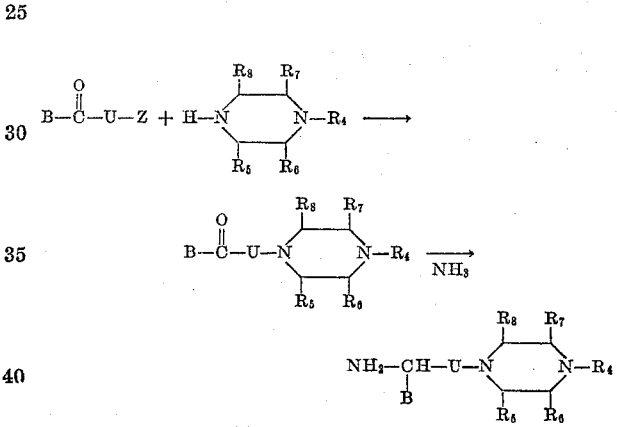

wherein Z, $R_4$, $R_5$, $R_6$, $R_7$ and $R_8$ have the previously assigned significance, B is a lower alkyl, advisably having below 5 carbons, and U is a lower straight or branched alkylene group advisably of not more than 5 carbons.

1-substituted piperazines such as those previously named may be used in the process.

Among the alpha-haloalkanones which may be used in the reaction are chloroacetone, 1-bromo-2-butanone, 1-chloro-3-butanone and 1-chloro-3-pentanone.

Reaction between the 1-substituted piperazine and alpha-haloalkanone is readily effected in an inert liquid reaction medium such as benzene, n-heptane or the like. Reflux temperature is preferred to effect the reaction. After the reaction is terminated the product may be recovered by conventional methods.

Specifically illustrative of this process is the reaction of N-methyl piperazine with chloroacetone to give 1-methyl-4-acetonyl piperazine.

The 1-substituted-4-piperazine alkanones are converted to the corresponding amines by catalytic reduction in the presence of ammonia. The reduction may be readily effected by placing the alkanone in a suitable solvent such as an ethanolic solution of ammonia containing a suitable catalyst such as Raney nickel and feeding hydrogen in at a pressure of about 20 to 150 atmospheres. Temperatures of 40 to 150° C. may be used.

Some of the 1-substituted -4-piperazinoalkylamines produced in this way are 1-methyl-4-(2-aminopropyl)-piperazine, 1 - phenylisopropyl-4-(2-aminopropyl)-piperazine and 1-ethyl-4-(3-aminobutyl)-piperazine.

The following examples are presented to illustrate specific embodiments of the invention:

EXAMPLE 1

*1-Methyl-4-Piperazinoisopropyl Benzilamide Dihydrochloride*

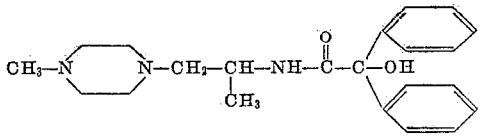

To 26.5 g. (0.1 M) of alpha-chlorodiphenylacetyl chloride dissolved in 75 cc. of dry benzene was added a solution consisting of 15.7 g. (0.1 M) of 1-methyl-4-(2-aminopropyl)-piperazine, 10.1 g. (0.1 M) of triethyl amine and 75 cc. of dry benzene. The mixture was refluxed for two hours and then the triethyl amine hydrochloride was removed by filtration. The filtrate was evaporated to dryness and the residue was dissolved in 300 cc. of acetone and acidified with ethereal hydrochloric acid. The solid was collected by filtration and dried. Yield 42.5 g. (92.6%).

18.4 grams (0.04 M) of the above solid was dissolved in 150 cc. of water, refluxed for five minutes, and evaporated to dryness. Yield 15.9 g. M.P. 235–237° C. It was recrystallized from a (1:1) methanol-ethanol solution, yield 8.8 g., M.P. 242° C. (dec.).

*Analysis.*—Calcd. for $C_{22}H_{31}Cl_2N_3O_2$: N, 6.36; Cl, 16.10. Found: N, 6.43; Cl, 15.54.

EXAMPLE 2

*1-Methyl-4-Piperazinopropyl Benzilamide Dihydrochloride*

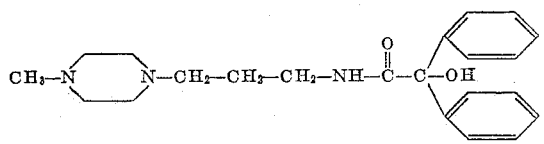

To 24.5 g. (0.093 M) of alpha-chlorodiphenylacetyl chloride dissolved in 100 cc. of dry benzene was added a solution consisting of 14.55 g. (0.093 M) of 1-methyl-4-(3-aminopropyl)-piperazine, 9.3 g. (0.093 M) of triethyl amine and 100 cc. of dry benzene. The material was treated in the same manner as Example 1, yield 18.2 g. (44.5%) M.P. 260° C. (dec.).

*Analysis.*—Calcd. for $C_{22}H_{31}Cl_2N_3O_2$: N, 6.36; Cl, 16.10. Found: N, 6.32; Cl, 16.07.

EXAMPLE 3

*1,2-Dimethyl-4-Piperazinopropyl Benzilamide Dihydrochloride*

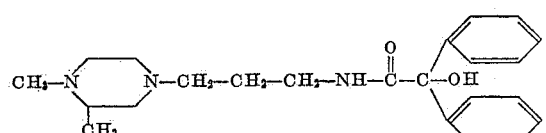

This compound was produced by the method described in Example 1 using 1,2-dimethyl-4-(3-aminopropyl)-piperazine and alpha-chlorodiphenylacetyl chloride as reactants.

EXAMPLE 4

*1,2,5-Cis-Trimethyl-4-Piperazino-Propyl-Benzilamide*

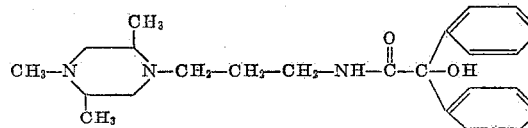

This compound was produced by the method described in Example 1 using 1,2,5-cis-trimethyl-4-(3-aminopropyl)-piperazine and alpha-chlorodiphenylacetyl chloride as reactants.

EXAMPLE 5

*1-(1'-Phenyl-2'-Propyl)-4-Piperazino-Propyl Benzilamide*

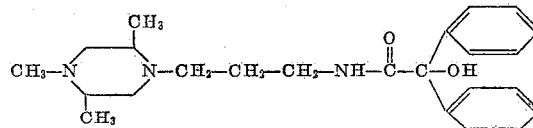

This compound was prepared by the method of Example 1 by reacting 1-(1'-phenyl-2'-propyl)-4-(3-aminopropyl)-piperazine with alpha-chlorodiphenylacetyl chloride.

EXAMPLE 6

*1-(1'-Phenyl-2'-Propyl)-Piperazine Dihydrochloride*

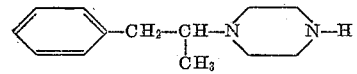

To a mixture consisting of 86 g. (1 M) of anhydrous piperazine and 300 cc. of dry toluene at reflux was added 100 g. (0.5 M) of 1-phenyl-2-bromopropane in one hour. The solution was refluxed for three hours, and was then extracted with three 75 cc. portions of 6 N hydrochloric acid. The combined extracts were washed twice with 100 cc. portions of ether. The aqueous solution was neutralized and then saturated with sodium hydroxide with cooling. The oil was extracted from the aqueous solution with three 100 cc. portions of ether. The organic solution was dried over potassium carbonate. The ether was distilled off through a 5″ column and the residue was vacuum distilled. B.P. 96–97° C. at 0.4 mm. Yield 26 g. (25.5%). $N_D^{25}$ 1.5378.

*Analysis.*—Calcd. for $C_{13}H_{20}N_2$: N, 13.71. Found: N, 13.69.

EXAMPLE 7

*1-(1'-Phenyl-2'-Propyl)-4-(Beta-Cyanoethyl)-Piperazine*

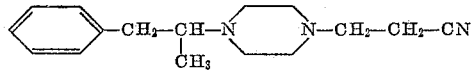

To 10.6 g. (0.2 M) of acrylonitrile was added dropwise with stirring 20.4 g. (0.1 M) of N-(1-phenyl-2-propyl)piperazine. The reaction mixture was refluxed for five hours, and then the excess acrylonitrile was removed by distillation. The residue was vacuum distilled through a 2″ column. B.P. 148–160° C. (0.125–0.150 mm.). Yield 15.8 g. (61.5%) $N_D^{25}$ 1.5302.

*Analysis.*—Calcd. for $C_{16}H_{23}N_3$: N, 10.88. Found: N, 10.56.

EXAMPLE 8

*1-Formyl-2-Methyl-4-(Beta-Cyanoethyl)-Piperazine*

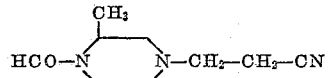

To 31.8 g. (0.6 M) of acrylonitrile was added dropwise with stirring 38.4 g. (0.3 M) of 1-formyl-2-methyl-piperazine. The reaction mixture was stirred and refluxed for five hours, and the excess and unreacted acrylonitrile was removed by distillation through a 4" column. The residue was fractionated under vacuum using a 4" column. B.P. 163° C./0.2 mm. $N_D^{25}$ 1.5042. Yield, 31.8 g. (58.6%) 11.4 g. (29.7%) of unreacted 1-formyl-2-methylpiperazine was recovered.

*Analysis.*—Calcd. for $C_9H_{15}N_3O$: N, 23.19. Found: N, 22.96.

EXAMPLE 9

*1,2-Dimethyl-4-(Gamma-Propylamino)-Piperazine*

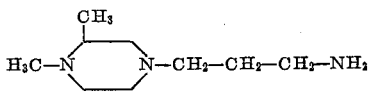

To 13.8 g. (0.36 M) of $LiAlH_4$ in 500 ml. of freshly distilled tetrahydrofuran was added dropwise with stirring a solution of 31.4 g. (0.17 M) of 1-formyl-2-methyl-4-(beta-cyanoethyl)piperazine in 250 ml. of freshly distilled tetrahydrofuran within 90 minutes. Some heat was supplied during the addition period in order to maintain reflux. The reaction mixture was stirred and refluxed for three hours, and the metal complexes were decomposed with 30 ml. of $H_2O$ followed by 50 ml. of 40% aqueous KOH. The salts were filtered off, washed with tetrahydrofuran and the filtrate was dried over anhydrous potassium carbonate. The solution was filtered, and the solvent was removed by distillation through a 4" column. The residue was fractionated under vacuum using a 4" column. B.P. 76–78°C./1.2 mm. $N_D^{25}$ 1.4800. Yield 9.6 g. (32.9%).

*Analysis.*—Calcd. for $C_9H_{21}N_3$: N, 24.56. Found: N, 24.01.

EXAMPLE 10

*1-Formyl-Cis-2,5-Dimethyl-4-(Beta-Cyanoethyl)-Piperazine*

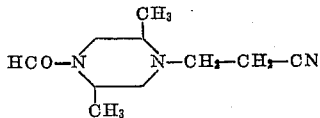

To 74.8 g. (1.45 M) of acrylonitrile was added dropwise with stirring 99.5 g. (0.70 M) of 1-formyl-cis-2,5-dimethylpiperazine. The reaction mixture was stirred and refluxed for five hours, and the excess and unreacted acrylonitrile was removed by distillation through a 4" column. The residue was fractionated under vacuum using a 2" column. B.P. 155–156° C./0.3 mm. Yield, 51.7 g. (37.9%), 49 g. or 49.5% of unreacted 1-formyl-cis-2,5-dimethylpiperazine was recovered.

*Analysis.*—Calcd. for $C_{10}H_{17}N_3O$: N, 21.54. Found: N, 21.02.

EXAMPLE 11

*1-Benzyl-4-Piperazinoethyl Benzilamide Hydrochloride*

To 26.5 g. (0.1 M) of alpha-chlorodiphenylacetyl chloride in 75 cc. of dry benzene is added a solution consisting of 0.1 M. of 1-benzyl-4-(2-aminoethyl)-piperazine, 10.1 g. (0.1 M) of triethylamine and 75 cc. of dry benzene. The mixture is refluxed for two hours and then the triethylamine hydrochloride removed by filtration. The filtrate is evaporated to dryness, the residue dissolved in 300 cc. of acetone and acidified with ethereal hydrochloric acid. The solid is collected by filtration, dissolved in 150 cc. of water, refluxed for five minutes and evaporated to dryness.

EXAMPLE 12

*4-Piperazinoethyl Benzilamide Hydrochloride*

A mixture consisting of about 42.3 g. of 1-benzyl-4-piperazinoethyl benzilamide hydrochloride, 6 g. (10%) of palladium-on-carbon and 200 cc. of ethanol is placed in a Parr hydrogenator heated to 50° C. under 60 p.s.i. of hydrogen for six hours until the theoretical amount of hydrogen is absorbed. The catalyst is filtered off through a celite bed, and the filtrate evaporated to dryness.

Various changes and modifications of the invention can be made and, to the extent that such variations incorporate the spirit of this invention, they are intended to be included within the scope of the appended claims.

What is claimed is:

1. A member of the group consisting of compounds of the formula

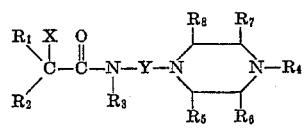

and nontoxic therapeutic acid addition salts thereof, wherein $R_1$ and $R_2$ are members of the group consisting of phenyl, halophenyl, lower alkoxyphenyl, hydroxyphenyl, aminophenyl, phenyl-lower alkyl, thienyl, pyridyl, cyclohexyl, cyclopentyl and 2-furyl groups, $R_3$ is a member of the group consisting of hydrogen and lower alkyl groups, $R_4$ is a member of the group consisting of hydrogen, lower alkyl, phenyl, halophenyl, lower alkoxy-phenyl, hydroxyphenyl, aminophenyl, phenyl-lower alkyl, hydroxy-lower alkyl, hydroxy-lower alkoxy-lower alkyl, lower alkanolyloxy-lower alkoxy-lower alkyl, lower alkanoyl, and lower alkenyl groups, $R_5$, $R_6$, $R_7$ and $R_8$ are members of the group consisting of hydrogen and lower alkyl groups, X is a member of the group consisting of hydroxy, reactive halogens and lower alkanoyloxy groups and Y is a member of the group consisting of straight and branched alkylene groups of 2 to 5 carbons.

2. 1-lower alkyl 4-piperazine-lower alkyl benzilamide, the alkyl group between the piperazino and benzilamide moieties having 2 to 5 carbons.

3. 1-methyl-4-piperazinopropyl benzilamide.

4. 1,2-dimethyl-4-piperazinopropyl benzilamide.

5. 1,2,5-cis-trimethyl-4-piperazinopropyl benzilamide.

6. 1-(1'-phenyl-2' - propyl) - piperazinopropyl benzilamide.

7. 1-(phenyl-lower alkyl)-piperazino-lower alkyl benzilamide, said lower alkyl groups containing 2 to 5 carbons.

8. 1-benzyl-piperazinoethyl benzilamide.

9. Piperazino-lower alkyl benzilamide, the alkyl group between the piperazino and benzilamide moieties having 2 to 5 carbons.

10. 1-(1'-phenyl-2'-propyl)-4-(beta-cyanoethyl) - piperazine.

11. 1-formyl-2-methyl-4-(beta-cyanoethyl)-piperazine.

12. 1-formyl-cis-2,5-dimethyl-4 - (beta - cyanoethyl)-piperazine.

13. Piperazinoethyl benzilamide.

14. The process which comprises reacting a compound of the formula

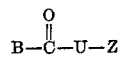

with a compound of the formula

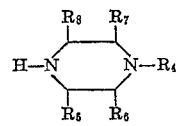

to produce a compound of the formula

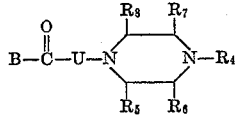

and reducing said compound by catalytic hydrogenation in a liquid medium in the presence of ammonia to produce a compound of the formula

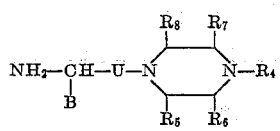

wherein B is a lower alkyl group, U is a lower alkylene group, Z is a reactive halogen, and $R_4$ is a member of the group consisting of lower alkyl, phenyl, halophenyl, lower alkoxyphenyl, hydroxyphenyl, aminophenyl, phenyl-lower alkyl, hydroxy-lower alkyl, hydroxy-lower alkoxy-lower alkyl, lower alkanoyloxy-lower alkoxy-lower alkyl, lower alkanoyl and lower alkenyl groups, and $R_5$, $R_6$, $R_7$ and $R_8$ are members of the group consisting of hydrogen and lower alkyl groups.

15. The process which comprises reacting a compound of the formula

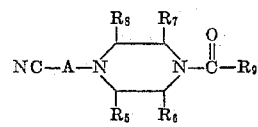

with lithium aluminum hydride in an anhydrous liquid reaction medium to produce a compound of the formula

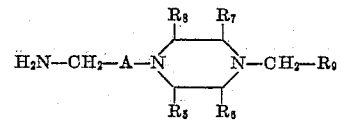

wherein $R_5$, $R_6$, $R_7$ and $R_8$ are members of the group consisting of hydrogen and lower alkyl groups, $R_9$ represents a member of the group consisting of hydrogen, lower alkyl groups, phenyl, halophenyl, lower alkoxyphenyl, hydroxphenyl, aminophenyl, phenyl-lower alkyl, hydroxy-lower alkyl and hydroxy-lower alkoxy-lower alkyl groups, and A is a member of the group consisting of lower straight and branched alkylene groups of 2 to 5 carbons.

No references cited.

UNITED STATES PATENT OFFICE
CERTIFICATE OF CORRECTION

Patent No. 3,030,366　　　　　　　　　　　　April 17, 1962

John H. Biel

It is hereby certified that error appears in the above numbered patent requiring correction and that the said Letters Patent should read as corrected below.

Column 5, lines 63 and 64, for "hydroalkoxyalkyl" read -- hydroxyalkoxyalkyl --; column 10, line 36, for "piperazine" read -- piperazino --.

Signed and sealed this 31st day of July 1962.

(SEAL)
Attest:

ERNEST W. SWIDER
Attesting Officer

DAVID L. LADD
Commissioner of Patents